United States Patent [19]

Larson et al.

[11] 4,383,953
[45] May 17, 1983

[54] METHOD OF IMPROVING THE GREEN STRENGTH OF NUCLEAR FUEL PELLETS

[75] Inventors: Richard I. Larson; Henry C. Brassfield, both of Wilmington, N.C.

[73] Assignee: General Electric Company, San Jose, Calif.

[21] Appl. No.: 280,490

[22] Filed: Jul. 6, 1981

Related U.S. Application Data

[63] Continuation-in-part of Ser. No. 113,626, Jan. 21, 1980, abandoned.

[51] Int. Cl.³ .............................................. G21C 21/00
[52] U.S. Cl. .................................... 264/0.5; 252/638; 252/643
[58] Field of Search ................... 252/638, 643; 264/0.5

[56] References Cited

U.S. PATENT DOCUMENTS

| | | | |
|---|---|---|---|
| 3,803,273 | 4/1974 | Hill et al. | 264/0.5 |
| 3,923,933 | 12/1975 | Lay | 264/0.5 |
| 3,927,154 | 12/1975 | Carter | 264/0.5 |
| 4,061,700 | 12/1977 | Gallivan | 264/0.5 |

FOREIGN PATENT DOCUMENTS 950168  7/1974  Canada ............................... 264/0.5

Primary Examiner—Leland A. Sebastian
Attorney, Agent, or Firm—Ivor J. James, Jr.; Samuel E. Turner; Raymond G. Simkins

[57] ABSTRACT

A process for imparting increased strength and physical durability in green bodies or pellets formed of particulate oxides of uranium, plutonium and the like in the production of pelletized fissionable nuclear fuel. The green or unfired pellets comprise a fugitive binder dispersed through the particulate oxide fuel material.

21 Claims, 2 Drawing Figures

METHOD OF IMPROVING THE GREEN STRENGTH OF NUCLEAR FUEL PELLETS

This application is a continuation-in-part of copending application Ser. No. 113,626, filed Jan. 21, 1980, now abandoned of the same title.

This invention relates to manufacturing techniques and procedures comprising compressing particulate ceramic materials into compacted, coherent and handleable bodies for subsequent sintering to produce integrated units or products, and it particularly relates to a method of forming green or presintered pellets of particulate fissionable nuclear fuel material having increased physical strength and integrity for enduring subsequent handling or processing, such as sintering and grinding to dimensions, and their final utilization.

Various materials are used as fissionable nuclear fuels for nuclear reactors including ceramic compounds of uranium, plutonium and thorium with particularly preferred compounds being uranium oxide, plutonium oxide, thorium oxide and mixtures thereof. An especially preferred fissionable nuclear fuel for use in nuclear reactors is uranium dioxide.

Uranium dioxide is produced commercially as a fine, fairly porous powder which cannot be used directly as nuclear fuel. It is not a free-flowing powder but clumps and agglomerates, making it difficult to pack in reactor tubes to the desired density.

The specific composition of a given commercial uranium dioxide powder may also prevent it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermal conductivity decreases with increasing O/U ratios, uranium dioxide having as low an O/U ratio as possible is preferred. However, since uranium dioxide powder oxidizes easily in air and absorbs moisture readily, the O/U ratio of this powder is significantly in excess of that acceptable for fuel.

Although uranium dioxide suitable as a fissionable nuclear fuel can have an O/U ratio ranging from 1.7 to 2.015, as a practical matter, a ratio of 2.00 and suitably as high as 2.015 has been used since it can be consistently produced in commercial sintering operations. In some instances, it may be desirable to maintain the O/U ratio of the uranium dioxide at a level higher than 2.00 at sintering temperature. For example, it may be more suitable under the particular manufacturing process to produce a nuclear fuel having an O/U ratio as high as 2.195, and then later treat the sintered product in a reducing atmosphere to obtain the desired O/U ratio.

A number of methods have been used to make uranium dioxide powder suitable as a fissionable nuclear fuel. Formerly, the most common method was to die press the powder into cylindrically-shaped green bodies of specific size without the assistance of binders since the complete removal of binders and their decomposition products was difficult to achieve prior to sintering. The entrainment of binder residues is considered unacceptable in sintered nuclear fuels.

In the sintering process, it is desirable to develop strong diffusion bonds between the individual particles without significantly reducing the interconnecting porosity of the body. The use of organic binders inhibits the formation of strong bonds unless a presintering treatment is applied to remove the binder. The higher compacting pressures and sintering temperatures required to develop such bonds sharply reduce the desired porosity.

Sintering atmospheres may range from about 1000° C. to about 2400° C. with the particular sintering temperature depending largely on the sintering atmosphere. For example, when wet hydrogen gas is used as the sintering atmosphere, its water vapor accelerates the sintering rate thereby allowing the use of correspondingly lower sintering temperatures such as a temperature of about 1700° C. The sintering operation is designed to densify the bodies and bring them down to the desired O/U ratio or close to the desired O/U ratio.

Conventional organic or plastic binders are unsuitable for use in powder fabrication of nuclear fuel since they tend to contaminate the interior of the sintered body with impurities such as carbon, and their removal requires a separate binder removal treatment or operation. In addition, upon decomposition, these binder materials often leave deposits of organic materials in the equipment utlized to sinter the article, thereby complicating the maintenance procedures for the equipment.

U.S. Pat. No. 4,061,700, issued Dec. 6, 1977 to Gallivan, and assigned to the same assignee as this application, discloses a group of new fugitive binders that produce improved sintered bodies of nuclear fuel materials for nuclear reactors by powder ceramic techniques without contaminating the resultant fuel or manufacturing systems, and which permit, through sintering, the formation of strong bonds between the sintered particles without deleteriously affecting porosity.

The improved fugitive binders of said U.S. Pat. No. 4,061,700 comprise a compound or its hydration products containing ammonium cations and anions selected from the group consisting of carbonate anions, bicarbonate anions, carbamate anions and mixtures of such anions, preferably a binder selected from the group consisting of ammonium bicarbonate, ammonium carbonate, ammonium bicarbonate carbamate, ammonium sesquicarbonate, ammonium carbamate and mixtures thereof.

The binders disclosed in this patent are efficient binders for use in nuclear fuels, and further the binders enable the realization of defect free, pressed bodies of nuclear fuel materials and tensile strength in the bodies comparable to strengths achieved with long chain hydrocarbon binders. Further, the binders in this patent leave substantially no impurities in the nuclear fuel material since these binders decompose upon heating into ammonia ($NH_3$), carbon dioxide ($CO_2$) and water ($H_2O$) (or water vapor) at temperatures as low as 30° C.

The disclosure of the aforesaid U.S. Pat. No. 4,061,700, and U.S. Pat. Nos. 3,803,273; 3,923,933; and 3,927,154, also assigned to the same assignee as the subject application, each relating to significant aspects in the subject field of producing nuclear fuel pellets or bodies from particulate fissionable ceramic material, are all incorporated herein by reference.

Notwithstanding the significant contributions of the inventions of above patents to this field and their specific advances in that technology, there remains a need to further increase the green or unfired strength and durability of consolidated bodies or pellets of such particulate ceramic nuclear fuel materials prior to their sintering and thereafter, to thereby reduce the high number of rejects and production costs incurred during manufacture resulting from imperfections or flaws attributable to marginal green or unfired strength or physical integrity.

SUMMARY OF THE INVENTION

This invention comprises a method for producing green or unfired compressed bodies or pellets of particulate fissionable ceramic fuel materials with fugitive binders of the type and materials set forth in the above cited patents, having significantly greater strength and physical integrity prior to firing or in the green stage, and thereafter, and the improved products derived therefrom. In addition to the specific components or ingredients given, this invention comprises a combination of sequenced manufacturing steps or operations including an essential aging period effected or carried out intermediate to certain of such sequenced steps or operations of the overall procedure.

The method of this invention enables the practice of a process with an exceptionally low level of rejects or physical imperfections for the formation and subsequent sintering of bodies of fissionable nuclear fuel, comprising the steps of admixing the nuclear fuel material in particulate form with the binder, forming the resulting mixture into a green body having a density ranging from about 30% to about 70% of theoretical density of the nuclear fuel material, heating said green body to decompose substantially all the binder into gases, further heating the body to produce a sintered body and cooling the sintered body in a controlled atmosphere.

This invention also provides a composition of matter that is suitable for sintering in the form of a compacted, coherent handleable structure comprising a mixture of a nuclear fuel material and a binder of a compound or its hydration products containing ammonium cations and anions selected from the group consisting of carbonate anions, bicarbonate anions, carbamate anions and mixtures of such anions and preferably a binder selected from the group consisting of ammonium bicarbonate, ammonium carbonate and mixtures thereof.

OBJECTS OF THE INVENTION

It is an object of this invention to provide an improved method of manufacturing compacted, coherent and handleable bodies or pellets of nuclear fuel from particulate fissionable ceramic material, and the compressed products of such method.

It is also an object of this invention to provide a method of improving the strength and physical integrity of green or unfired compressed and integrated bodies or pellets of nuclear fuel comprising particulate fissionable material and a fugitive binder, and the physically enhanced products thereof.

It is a further object of this invention to provide a method for forming and sintering a body of nuclear fuel comprising the steps of admixing the nuclear fuel material in fine particulate form with a binder, forming the resulting mixture into a coherent and handleable green body, heating said green body to dispel any binder ingredients and to produce a durable sintered body wherein the number of rejects due to inadequate strength or physical durability of the green or as yet unsintered bodies, and in turn production costs, are significantly reduced.

It is another object of this invention to provide a method for preparing particulate admixtures for producing green or unfired compressed bodies or pellets of particulate fissionable nuclear fuel materials admixed with a fugitive binder that are resistant to pressing flaws or deformities whereby the compressed bodies or pellets formed therefrom are substantially uniform throughout in configuration and physical integrity, and substantially free of physical imperfections or irregularities such as end flakes, radial cracks, fractures, chips and the like debilitating defects that impair the physical integrity of the units and cause their inability to meet specifications for nuclear fuel or simply their ultimate failure in physical structure.

A still further object of this invention is to provide a method for preparing particulate admixtures of fissionable nuclear fuel material with a binder for producing compressed and sintered bodies or pellets wherein the density of the sintered product is controlled by the inclusion of a pore forming substance such as ammonium oxalate.

DETAILED DESCRIPTION OF THE INVENTION

Figure 1:
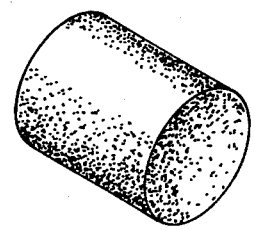
FIG. 1 of the drawing comprises a perspective view of a fuel pellet of this invention.

This invention comprises the discovery of an improved manufacturing procedure for the formation of coherent pellets or bodies of compacted particulate ceramic materials having markedly enhanced physical strength and resistance to pressing deformities, a minimum of physical impediments or flaws, and which are durable and handleable when subjected to factory production operations. This new procedure for the formation of such firmly integrated or coherent units from particulate ceramic materials admixed with fugitive binders comprises a combination of a specific sequence of manufacturing steps or operations including an essential period for the maturing or reacting of the fugitive binder of blended admixtures of the ingredients prior to significant subsequent handling or processing thereof, such as the subsequent consolidation of the particulate components to a compacted shape and the sintering thereof, or following work thereon including grinding or cutting to shape or given dimensions.

This invention entails the admixing of a nuclear fuel or similar ceramic material in powder or relatively fine particulate form with a binder of a compound or its hydration products containing ammonium cations and anions selected from the group consisting of carbonate anions, bicarbonate anions, carbonate anions and mixtures of such anions.

The particulate nuclear fuel materials comprise the various materials used as nuclear fuels for nuclear reactors including ceramic compounds such as oxides of uranium, plutonium and thorium with particularly preferred compounds being uranium oxide, plutonium oxide, thorium oxide and mixtures thereof. An especially preferred nuclear fuel for use in this invention is uranium oxide, particularly uranium dioxide. Further the term nuclear fuel is intended to cover a mixture of the oxides of plutonium and uranium and the addition of one or more additives to the nuclear fuel material such as gadolinium oxide ($Gd_2O_3$).

In carrying out the present process which will be discussed for the preferred use of uranium dioxide, the uranium dioxide powder (or particles) used generally has an oxygen to uranium atomic ratio greater than 2100 and can range up to 2.25. The size of the uranium dioxide powder or particles ranges up to about 10 microns and there is no limit on lower particle size. Such particle sizes allow the sintering to be carried out within a reasonable length of time and at temperatures practical for commercial applications. For most applications, to obtain rapid sintering, the uranium dioxide powder has a size ranging up to about 1 micron. Commercial uranium dioxide powders are preferred and these are of small particle size, usually sub-micron generally ranging from about 0.02 micron to 0.5 micron.

Compositions suitable for use as a binder in the practice of this invention either alone or in mixtures, include ammonium bicarbonate, ammonium carbonate, ammonium bicarbonate carbamate, ammonium sesquicarbonate, ammonium carbamate and mixtures thereof. When mixed with nuclear fuel materials, these binders and the nuclear fuel material are believed to undergo the phenomenon of adhesion forming an ammonium derivative of the carbonate series such as $(NH_4)_4[UO_2(CO_3)_3]$; $(NH_4)_6[(UO_2)_2(CO_3)_5\ (H_2O)_2]H_2O$; $(NH_4)_2(CO_3)_2(H_2O)_2]$; $(NH_4)_3[(UO_2)_2(CO_3)_3)(OH)(H_2O)_5]$; $NH_4[UO_2(CO_3)(OH)\ (H_2O)_3]$ and $UO_2CO_3\ H_2O$, or mixtures of these.

In the present invention the binder preferably has certain characteristics. It should be substantially comprised of a compound or its hydration products containing ammonium cations and anions selected from the group consisting of carbonate anions, bicarbonate anions, carbamate anions and mixtures of such anions and free of impurities so that it can be mixed with uranium dioxide powder and pressed and sintered without leaving any undesired impurities after heating with particularly preferred binders being ammonium bicarbonate and ammonium carbonate and mixtures thereof. It has been found that commercially available ammonium bicarbonate contains virtually no impurities and commercially available ammonium carbonate also contains virtually no impurities except for other ammonium compounds as listed in the foregoing paragraph. Thermogravimetric analysis confirms that there is a complete volatilization of ammonium bicarbonate and ammonium carbonate at heating rates typically used for reductive atmospheric $UO_2$ sintering. Ammonium bicarbonate and ammonium carbonate when heated to the temperature range of decomposition, decompose to form ammonia, carbon dioxide and water at significant rates leaving substantially no contaminates (impurities) in the fuel and no undesirable residues in the sintering furnace. Additionally the ammonium bicarbonate and the ammonium carbonate are used in small particle sizes of 400 mesh or less in order to achieve maximum surface coverage of the binder on the surface of the nuclear fuel material. Ammonium bicarbonate is used as the binder when it is desired to avoid the formation of density reducing pores in the nuclear fuel material. The plasticity of ammonium bicarbonate and ammonium carbonate may be demonstrated by the fact that these compounds can be die pressed to green densities as high as 90% of theoretical density at moderate pressing pressures.

The amount of binder added to the nuclear fuel material generally ranges from about 0.5 to about 7.0 weight percent depending on the formability of the nuclear fuel material. For example formable uranium dioxide powders require less of an addition of the binder while less readily formable powders require larger amounts of binder. When the selected binder is ammonium carbonate, the amount of the addition of this binder is dependent upon the desired sintered density of the nuclear fuel material.

Homogeneous blending of the binder with the nuclear fuel material is practiced to develop fully the binding action of the binder on the nuclear fuel material. Where porosity or a lower density is not desired, the homogenous blending of the binder with the nuclear fuel material avoids the formation of agglomerates of the binder since such agglomerates can volatize during sintering leaving pores in the sintered nuclear fuel material which pores reduce the density of the nuclear fuel material in sintered bodies. When it is felt that agglomerates of the binder exist in the nuclear fuel material after mixing, a milling process such as jet milling or hammer milling is practiced so that the agglomerates are destroyed. The blended and milled powder may then be predensified by low pressure die pressing followed by granulation through a sizing screen to promote flowability of the mixture.

In carrying out this invention, it is preferred in order to achieve an optimum degree of uniformity of blending and freedom from non-homogeneous agglomerates therein that the binder be added to the particulate ceramic material by pneumatically injecting the binder into a mass of the particulate ceramic while suspended or fluidized in a fluid bed system and therein continuing the fluidized blending thereof until a substantially uniform dispersion of the binder about the particles of ceramic fuel material is achieved. A preferred fluid bed system for the addition and mixing of such ingredients is disclosed in U.S. Pat. Nos. 4,172,667, issued Oct. 30, 1979, and 4,168,914, issued Sept. 25, 1979.

Blending of the combined particulate binder and ceramic material preferably should be continued for a period of at least about 10 minutes to insure a high degree of homogeneity and to induce the formation of more handleable, small agglomerates of the blended ingredients.

In accordance with this invention the blend of such particulate ceramic material with the binder component described above is held for a relatively brief period of greater than 48 hours and preferably at least about 72 hours in a substantially quiescent state to age or mature the binder, prior to proceeding with the usual manufacturing operations or steps including compressing the particulate admixture into a consolidated or compacted coherent mass or body such as a pellet, and the subsequent sintering of such integrated bodies.

It appears that during this period, binders of the type or composition specified, undergo a degree of a decomposition reaction and conversion to products that provide an enhanced binding effect upon the ceramic particles which is markedly superior to that afforded by its precursor.

Following completion of said aging period or intermission, the matured mixture of particulate nuclear fuel material with the binder can be formed into a green body, generally a cylindrical pellet by a number of techniques such as pressing (particularly die pressing). Specifically, the mixture is compressed into a form in which it has the required mechanical strength for handling and which, after sintering, is of the size which satisfies reactor specification. The aging of the binders of this invention in the nuclear fuel material significantly enhances both the strength and integrity of the resulting green body. The green body can have a density ranging from about 30% to 70% of theoretical, but usually it has a density ranging from about 40% to 60% of theoretical, and preferably about 50% of theoretical.

The green body is sintered in an atmosphere which depends on the particualr manufacturing process. Specifically, it is an atmosphere which can be used to sinter uranium dioxide alone in the production of uranium dioxide nuclear fuel and also it must be an atmosphere which is compatible with the gases resulting from any decomposition of binder ingredients. For example, a number of atmospheres can be used such as an inert atmosphere, a reducing atmosphere (e.g. dry hydrogen) or a controlled atmosphere comprised of a mixture of gases (e.g. a mixture of hydrogen and carbon dioxide as set forth in U.S. Pat. No. 3,872,022) which in equilibrium produces a partial pressure of oxygen sufficient to maintain the uranium dioxide at a desired oxygen to uranium ratio.

The rate of heating to sintering temperature is limited largely by how fast the by-product gases are removed prior to achieving a sintering temperature and generally this depends on the gas flow rate through the furnace and its uniformity therein as well as the amount of material in the furnace. Specifically, the rate of flow of gas through the furnace, which ordinarily is substantially the same gas flow used in the sintering atmosphere, should be sufficient to remove the gases resulting from decomposition of binder material before sintering temperature is reached. Generally, best results are obtained when the rate of heating to decompose and volatilize all binder materials ranges from about 50° C. per hour to about 300° C. per hour. After decomposition of the binder material is completed and byproduct gases substantially removed from the furnace, the rate of heating can then be increased, if desired, to a range of about 300° C. to 500° C. per hour and as high as 800° C. per hour but not be so rapid as to crack the bodies.

Upon completion of sintering, the sintered body is usually cooled to room temperature. The rate of cooling of the sintered body is not critical in the present process, but it should not be so rapid as to crack the sintered body. Specifically, the rate of cooling can be the same as the cooling rates normally or usually used in commercial sintering furnaces. These cooling rates may range from 100° C. to about 800° C. per hour, and generally, from about 400° C. per hour to 600° C. per hour. The sintered uranium dioxide bodies are preferably cooled in the same atmosphere in which they were sintered.

To govern the densities of the sintered bodies of ceramic fuel material of this invention, pore formers such as ammonium oxalate or a uranium precursor can be added to the fuel material along with the binders in the practice of this invention. The pore formers, when used, are preferably reduced to a uniformly fine granular form and premixed with the particulate ceramic material.

The green or unfired nuclear fuel pelleted product formed by the new process of this invention and exhibiting improved strength and physical integrity is illustrated in FIG. 1 of the drawing.

The following comprises an example of a preferred embodiment for the practice of this invention and an illustration of the pronounced improvement in tensile strength of the products produced thereby.

Uniformly fine powdered ammonium bicarbonate was introduced into uranium dioxide particles in a ratio of about 2.7 weight percent based on the $UO_2$ in the fluid bed system and apparatus of U.S. Pat. No. 4,172,667. The particulate admixture of $NH_4HCO_3$ and $UO_2$ was fluidized and agitated within the system for about 10 minutes, whereupon the resultant homogeneous blend of the particles was aged under quiescent or static condition for 72 hours prior to subsequent processing including pressing and compacting the particles into coherent integrated bodies or pellets. The process was thereafter completed by die pressing into cylindrical fuel pellets in accordance with the procedures set forth in U.S. Pat. No. 4,061,700.

The pellets produced from the thus aged product exhibited significantly greater strength and integrity in the green or unfired state with a tensile strength increased by a factor of about twofold over unaged admixtures prepared in a like manner except for aging intermission. After the routine firing of the compressed pellets, the aged pellet samples survived the grinding operation to achieve precise dimensions thereof to the extent of about 95% recovery whereas like produced but unaged pellets had a grinding recovery of less than about 50%.

Figure 2:
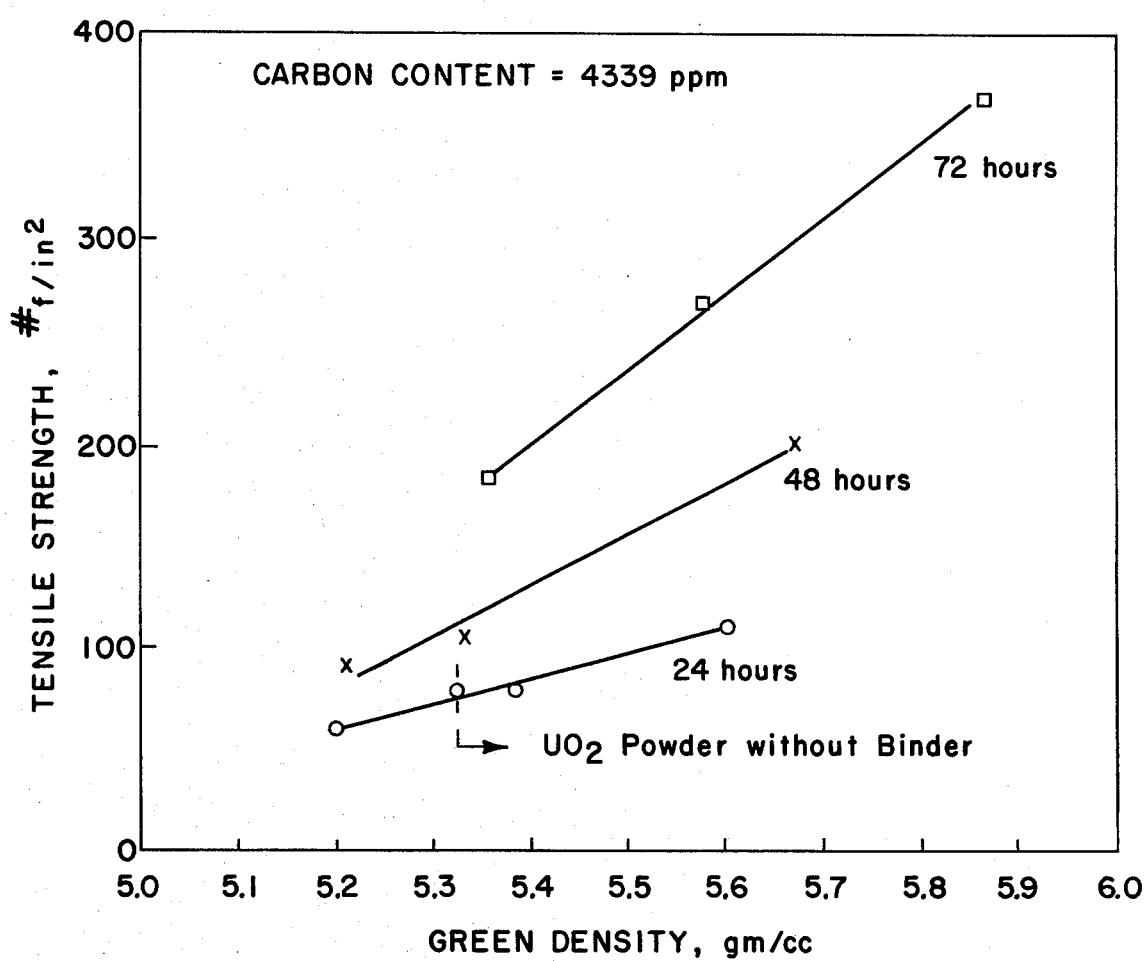
FIG. 2 of the drawing comprises a graph of the tensile strength of fuel pellets in relation to the pellet density and the period of aging for a specific amount of binder in particulate ceramic mixtures.

Further identically prepared samples of admixtures of ammonium bicarbonate binder with uranium dioxide were aged for several different periods of time, namely 24 hours, 48 hours and 72 hours, and compared with a sample likewise processed but without any binder. The results of this evaluation, measured in tensile strength, psi, are shown in the graph of FIG. 2 of the drawing.

I claim:

1. A method of preparing an admixture comprising a particulate material and a fugitive binder for producing green pellets free of flaws and having improved strength, comprising the steps of :
   (a) fluidizing and agitating a mass of particulate material with a fluidized bed system;
   (b) adding a fugitive binder to the fluidizing and agitating mass of particulate material and blending the binder with the particulate material, said fugitive binder being comprised of ammonium bicarbonate, ammonium carbonate, ammonium bicarbonate carbamate, ammonium sesquicarbonate, ammonium carbamate, and mixtures thereof;
   (c) aging the blended binder and particulate material for a period of greater than 48 hours; and
   (d) forming the resulting aged blend by pressing into a green body.

2. The method of claim 1, wherein the particulate material is comprised of uranium dioxide and plutonium dioxide.

3. The method of claim 1, wherein the particulate material is uranium dioxide.

4. The method of claim 1, wherein the binder is ammonium bicarbonate.

5. The method of claim 1, wherein ammonium oxalate is added to the particulate material as a pore former.

6. A method of preparing an admixture comprising a particulate material and a fugitive binder for producing porous green pellets free of flaws and having improved strength, comprising the steps of:
   (a) combining and blending ammonium oxalate with particulate uranium dioxide;
   (b) fluidizing and agitating a mass of particulate uranium dioxide with a fluidized bed system and adding thereto the combined and blended ammonium oxalate and particulate uranium dioxide;
   (c) adding a fugitive binder to the fluidizing and agitating mass of particulate uranium dioxide and blending the binder with the particulate material, said fugitive binder being comprised of ammonium bicarbonate, ammonium carbonate, ammonium bicarbonate carbamate, ammonium sesquicarbonate, ammonium carbamate, and mixtures thereof;
(d) aging the blended binder and particulate uranium dioxide for a period of at least about 72 hours; and
(e) forming the resulting aged blend by pressing into a green body.

7. The method of claim 6, wherein the binder is ammonium bicarbonate.

8. The method of claim 6, wherein the binder is added to the particulate uranium dioxide in amounts of about 0.5 to about 7.0 weight percent.

9. The method of claim 6, wherein the pressed green pellet comprising the aged blend of binder and particulate uranium dioxide is sintered.

10. A method of preparing an admixture comprising particulate uranium dioxide and a fugitive binder for producing green pellets free of flaws and having improved strength, comprising the steps of:
(a) fluidizing and agitating a mass of particulate uranium dioxide with a fluidized bed system;
(b) adding a fugative binder to the fluidizing and agitating mass of particulate uranium dioxide and blending the binder with the particulate uranium dioxide, said fugative binder being comprised of ammonium bicarbonate, ammonium carbonate, ammonium bicarbonate carbamate, ammonium sesquicarbonate, ammonium carbamate, and mixtures thereof;
(c) aging the blended binder and particulate uranium dioxide for a period of at least about 72 hours while substantially quiescent; and
(d) forming the resultant aged blend of binder and particulate uranium dioxide by pressing same into a green body.

11. The method of claim 10, wherein the binder is ammonium bicarbonate.

12. The method of claim 10, wherein the binder is added to the particulate uranium dioxide in amounts of about 0.5 to 7.0 weight percent.

13. The method of claim 10, wherein ammonium oxalate is added to the particulate uranium dioxide as a pore former.

14. The method of claim 10, wherein the pressed green pellet comprising the aged blend of binder and particulate uranium dioxide is sintered.

15. A method of preparing an admixture comprising a particulate uranium dioxide and a fugitive binder for producing porous green pellets free of flaws and having improved strength, comprising the steps of:
(a) combining and blending powdered ammonium oxalate with particulate uranium dioxide in approximately the same quantities by weight;
(b) fluidizing and agitating a mass of particulate uranium dioxide with a fluidized bed system and adding thereto the combined and blended ammonium oxalate and particulate uranium dioxide;
(c) adding a fugative binder to the fluidizing and agitating mass of particulate uranium dioxide in amount of about 0.5 to 7.0 weight percent and blending the binder with the particulate uranium dioxide, said fugative binder being composed of ammonium bicarbonate, ammonium carbonate, ammonium bicarbonate carbamate, ammonium sesquicarbonate, ammonium carbamate, and mixtures thereof;
(d) aging the blended binder and particulate uranium dioxide for a period of at least about 72 hours while substantially quiescent; and,
(e) forming the resulting aged blend of powdered ammonium oxalate, binder and particulate uranium dioxide by pressing into a green body.

16. The method of claim 15, wherein the binder is ammonium bicarbonate.

17. The method of claim 16, wherein the pressed green pellet comprising the aged blend of powdered ammonium oxalate, binder and particulate uranium dioxide is sintered.

18. The method of claim 15, wherein the blending of the binder and uranium dioxide is continued for at least about 10 minutes.

19. A method of preparing an admixture comprising a particulate uranium dioxide and a fugitive binder for producing green pellets free of flaws and having improved green strength, comprising the steps of:
(a) fluidizing and agitating a mass of particulate uranium dioxide with fluidized bed system;
(b) adding ammonium bicarbonate fugitive binder to the fluidizing and agitating mass of particulate uranium dioxide in amount of about 0.5 to about 7.0 weight percent and blending the binder with the particulate uranium dioxide for at least 10 minutes;
(c) aging the blended ammonium bicarbonate binder and particulate uranium dioxide for a period of at least about 72 hours while substantially quiescent to provide for the decomposition of the ammonium bicarbonate; and
(d) forming the resultant aged blend of binder and particulate uranium dioxide by pressing into a green body.

20. The method of claim 19, wherein the pressed green pellet comprising the aged blend of binder and particulate uranium dioxide is sintered.

21. The method of claim 19, wherein ammonium oxalate is added to the particulate uranium dioxide as a pore former.

* * * * *